May 8, 1962  E. C. BRISBANE  3,033,515
FLUID PRESSURE VALVE
Filed April 1, 1960  5 Sheets-Sheet 1

INVENTOR.
Eugene C. Brisbane
BY
Jennings Carter & Thompson
Attorneys

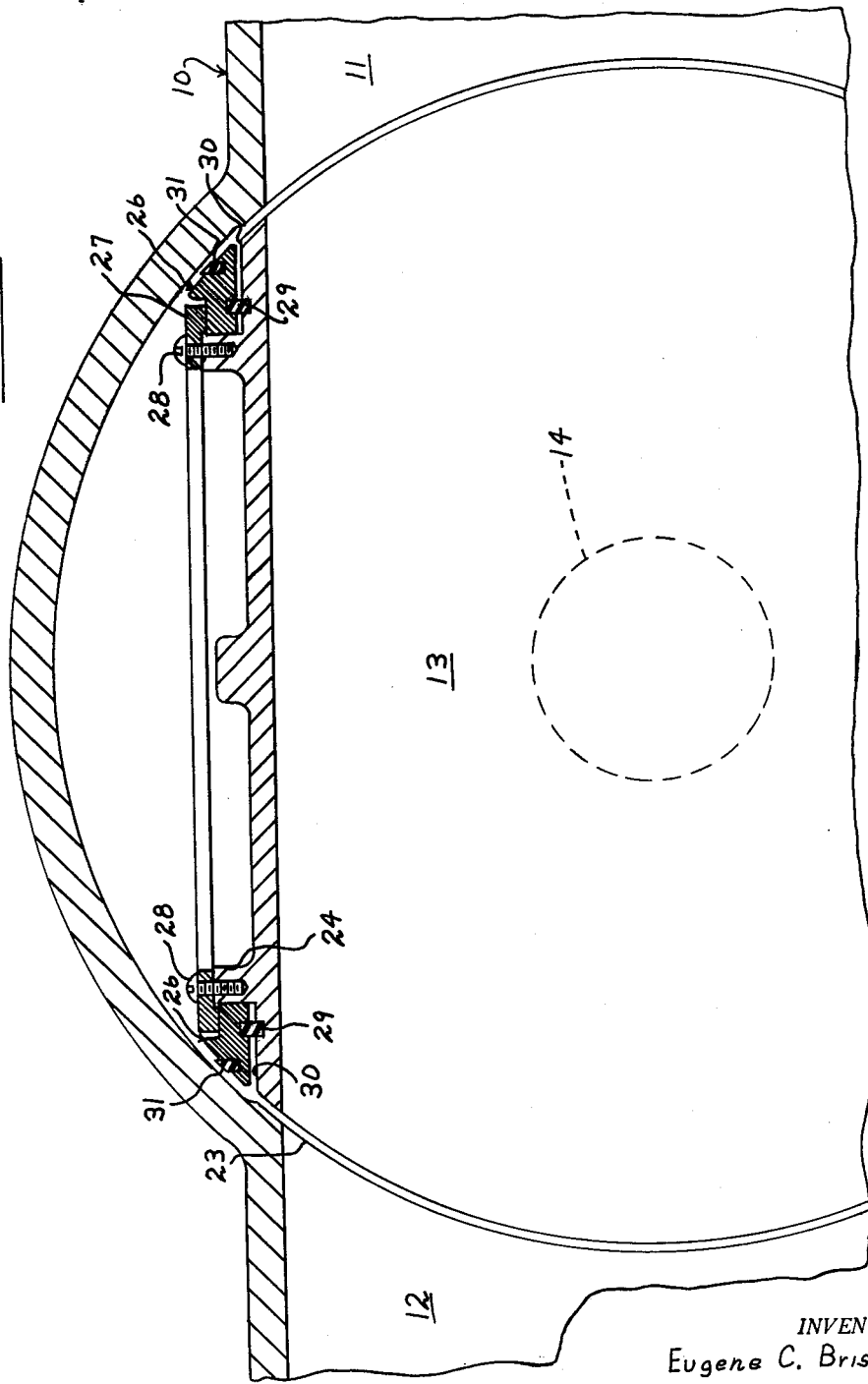

May 8, 1962 E. C. BRISBANE 3,033,515
FLUID PRESSURE VALVE
Filed April 1, 1960 5 Sheets-Sheet 3
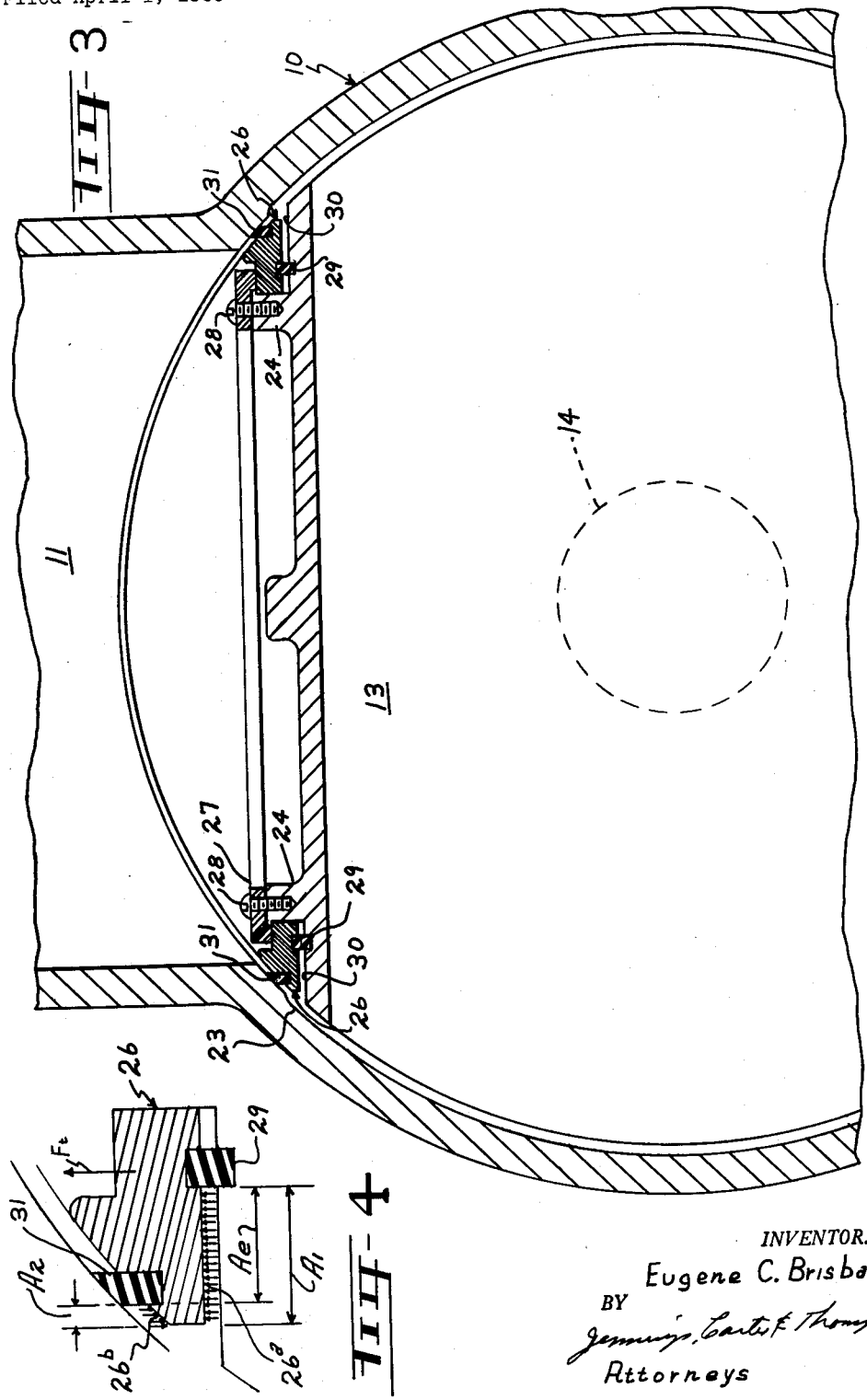
INVENTOR.
Eugene C. Brisbane
BY
Jennings, Carter & Thompson
Attorneys

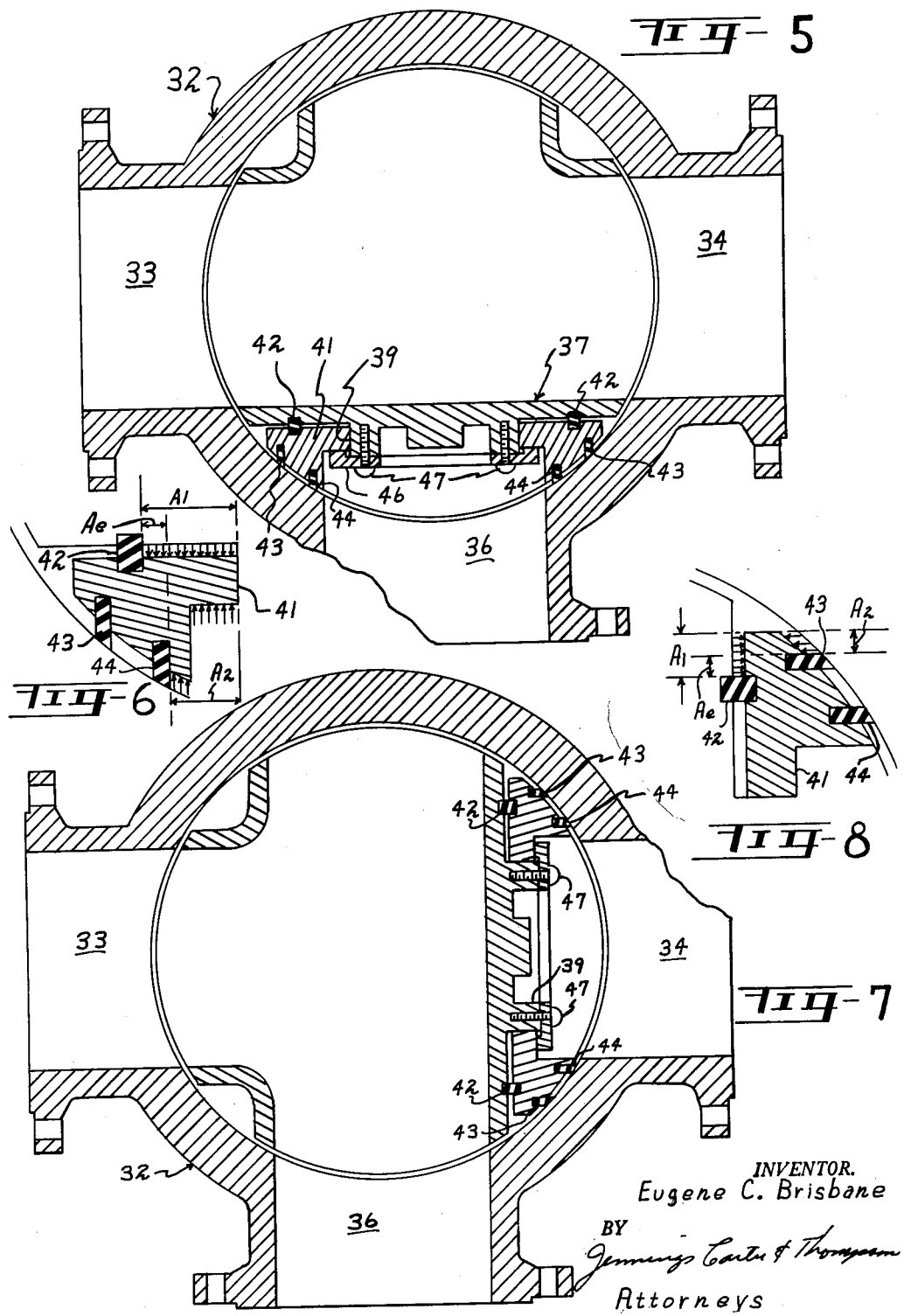

May 8, 1962  E. C. BRISBANE  3,033,515
FLUID PRESSURE VALVE
Filed April 1, 1960  5 Sheets-Sheet 5
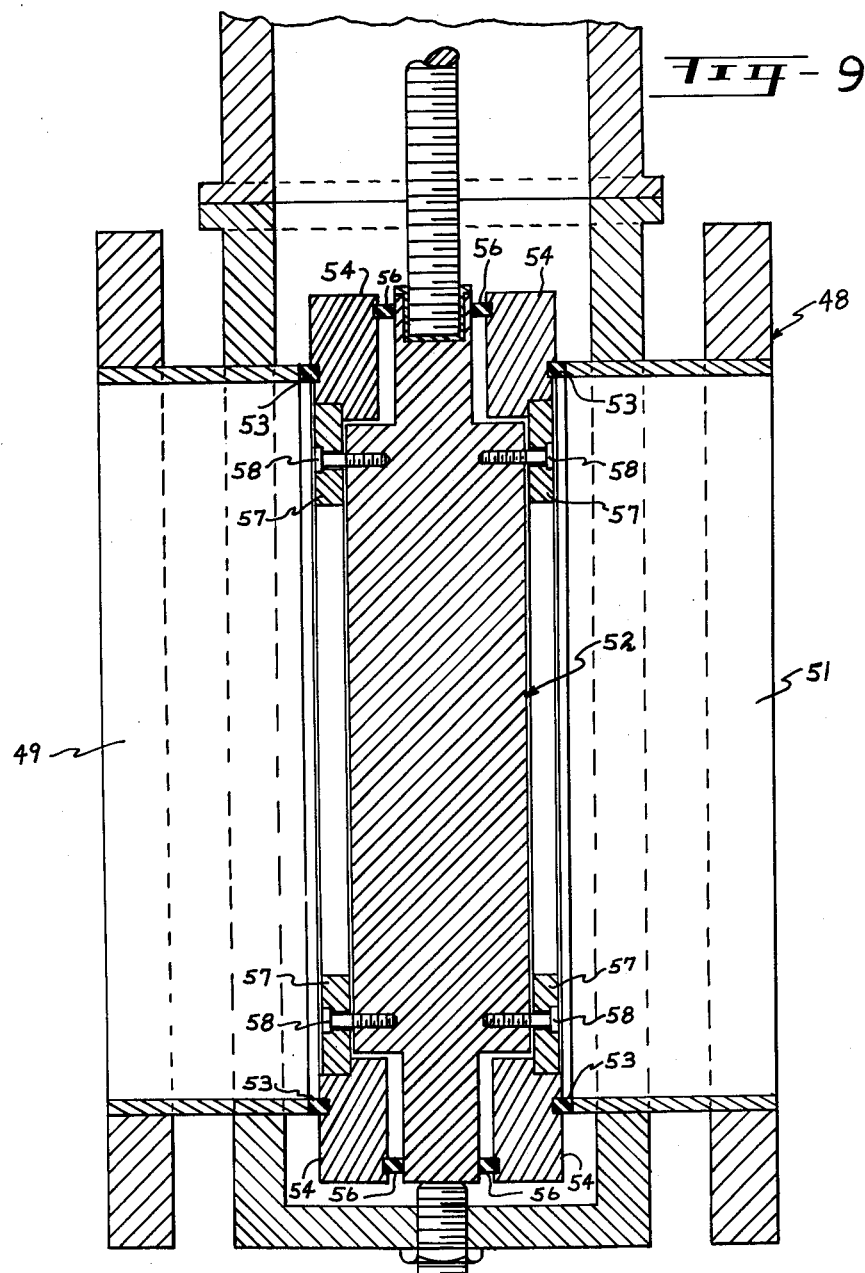
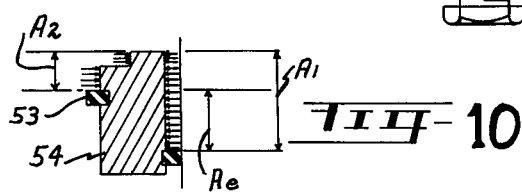
INVENTOR.
Eugene C. Brisbane
BY
Attorneys

United States Patent Office 3,033,515
Patented May 8, 1962

3,033,515
FLUID PRESSURE VALVE
Eugene C. Brisbane, Birmingham, Ala.
(1232 Ridge Ave., Pittsburgh 33, Pa.)
Filed Apr. 1, 1960, Ser. No. 19,249
1 Claim. (Cl. 251—175)

This invention relates to fluid pressure valves and is directed more particularly to an improved construction for limiting in predetermined manner the seating pressures of the seals in such valves.

In my prior Patent No. 2,857,130, October 21, 1958, "Valves," I show, describe and claim a valve construction in which the seating pressure of the main valve seat seal is lowered by mechanical means disposed between the seal carrying member and the gate. While in practice such arrangement has been very satisfactory, the present invention constitutes an improvement upon the same for use in many valves under many operating conditions.

My invention contemplates a gate carried seal for the valve seat in which the desired seating pressure of the seal is achieved by utilizing the fluid pressure in the valve as distinguished from limiting such pressure by mechanical stops, tramming screws, or the like.

More particularly, an object of my invention is to provide a gate and seal structure for fluid pressure valves in which the seal is held against the valve seat by fluid pressure acting against the seal structure, the total amount of such pressure being predetermined in the design of the structure by balancing in part the areas on the seal or seal carrying member which tend to move the seal toward and away from the seat, thereby providing an effective or resultant pressure area which holds the seal against the seat with sufficient pressure just to prevent leakage, but less than the pressure which would damage the seal during operation of the valve.

Another object is to provide apparatus of the character designated in which the seal disposed to coact with the valve seat is mounted on the gate or equivalent structure for movement away from the gate toward the seat, together with a seal disposed to seal between the gate and the first seal or a member carrying the first seal, in combination with means carried by the gate mechanically to pre-compress the second seal while still permitting the seat seal to move toward the seat as will be explained.

My invention contemplates structure of the kind described which, with minor variations, may be embodied in rotating valves, both single and multiport, plate valves, plug valves, and practically any other type valve having a gate or gate-like member movable from open to closed position.

Briefly, my invention comprises a member carrying a seal, which member is mounted on the gate for movement away from the gate toward a seat on the valve body when the gate is in closed position. On the valve seat side of the member I provide a valve seat gasket or seal, complementary in configuration to the seat, whether round, square, rectangular or otherwise. Mounted on the opposite side or face of the member is a second seal which is effective to seal between the member and the gate. The seals are so disposed relative to each other that a part of the area on the side of the member carrying the second seal, and which is subjected to fluid pressure, is hydrostatically balanced by an area on the seat seal side thereof. Therefore, the area of the member acted on by the fluid pressure and which tends to hold the seat seal against the valve seat can be calculated for any given valve operating at any given pressure. Thus, by providing more balancing area I can reduce the seat seal pressure; by providing less such area I can increase the seat seal pressure. By the addition of a mechanical stop or travel limiting member carried by the gate, I pre-load the second seal when assembling the structure. Therefore, when pressure acts on the seal carrying member it is free to move toward the seat an amount sufficient to bring about the desired sealing force without completely releasing the mechanical pressure on the second seal before the seal carrying member comes against the stop. My invention is thus characterized by a seal structure in which, by predetermination in the design of the structure (rather than by mechanical adjustment later), the seat seal pressure is automatically maintained at the optimum, thereby automatically obtaining in each valve the several advantages of correct, non-excessive seal seating pressure.

Apparatus illustrating features of my invention is shown in the accompanying drawings, forming a part of this application, in which:

FIG. 2 is an enlarged detail, fragmental sectional view taken generally along line 2—2 of FIG. 1, and showing the valve in the open position of FIG. 1;

FIG. 3 is an enlarged detail sectional view corresponding to FIG. 2 and showing the valve in closed position;

FIG. 4 is a wholly diagrammatic view illustrating the hydrostatic pressure on the sealing element;

FIG. 5 is a view of a three-way valve with the closure member in position in which pressure existing in one of the valve housing openings has been closed off;

FIG. 6 is a wholly diagrammatic view of the hydrostatic forces on the sealing elements with the valve in the position of FIG. 5;

FIG. 7 is a view corresponding to FIG. 5 and showing the valve in position to seal off one of the ports against pressure within the valve;

FIG. 8 is a wholly diagrammatic view showing the hydrostatic forces on the sealing element with the valve in the position of FIG. 7;

FIG. 9 is a fragmental detail sectional view through a slide gate valve; and

FIG. 10 is a wholly diagrammatic view illustrating the hydrostatic forces on the sealing element of the pressure side of the valve shown in FIG. 9.

Figure 1:
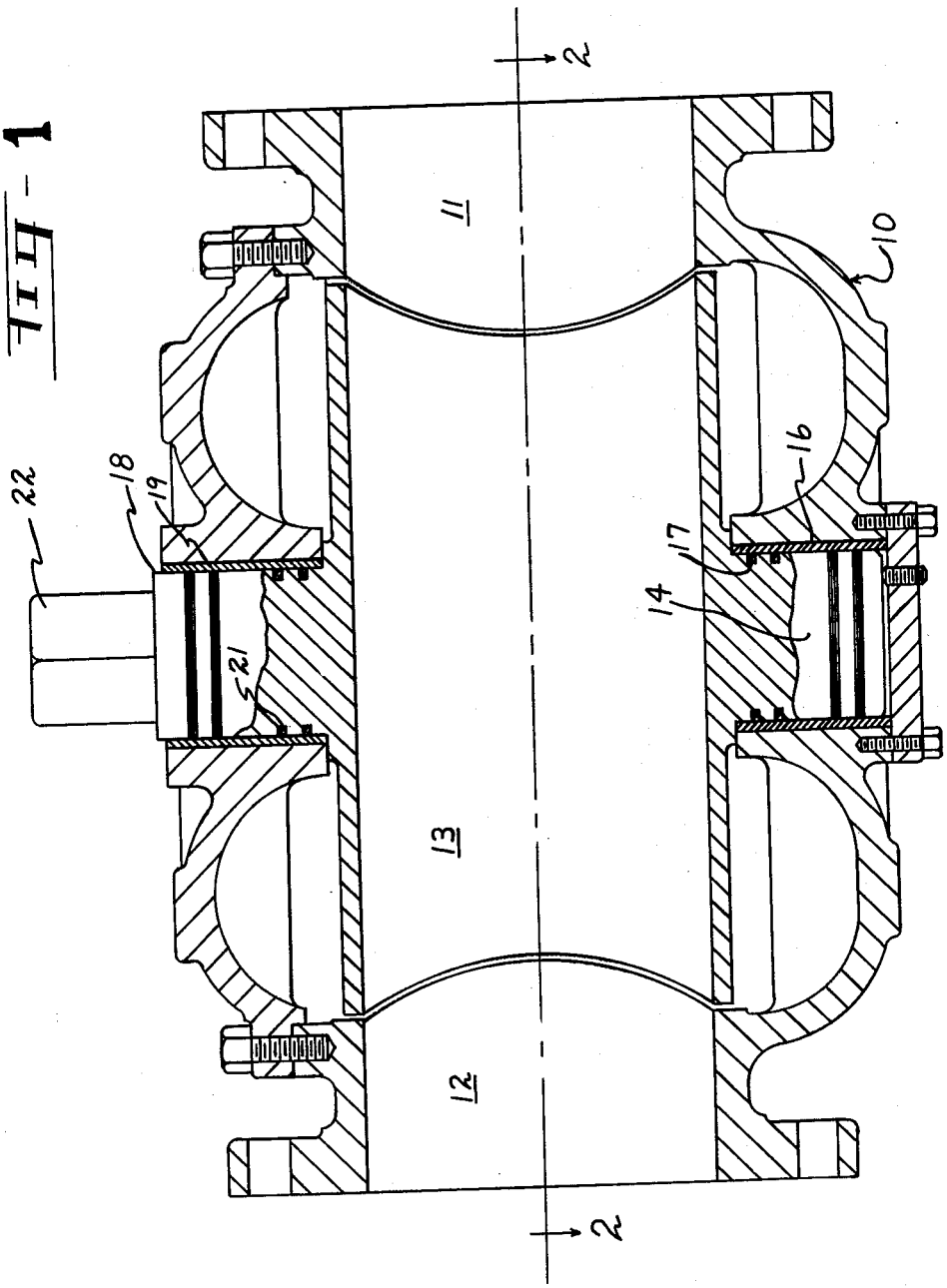
FIG. 1 is a vertical sectional view through a rotary type valve embodying my invention.

Referring now to the drawings and more particularly to FIGS. 1 to 4 inclusive, I show my invention in association with a rotary valve which may be generally of the construction shown in my above mentioned patent. Thus, the valve embodies a housing 10 which may have fluid passages 11 and 12 therein, either one of which may be the pressure or upstream side of the valve. Mounted in the valve housing 10 is a gate indicated generally by numeral 13. The gate may comprise a lower trunnion 14 which is journalled in a suitable sleeve bearing 16 carried by the housing and which may carry sealing elements in the form of rings of rubber or the like indicated at 17. The gate 13 may also have an upper trunnion 18, journalled in a sleeve bearing 19 carried by the housing. Seal rings 21 are provided on trunnion 18. The trunnion 18 may be fitted with a polygonal section 22 to receive a tool for rotating the gate.

From what has just been described, it will be understood that conduits carrying fluid under pressure may be connected to the ends of the passages 11 and 12 of the valve, or to either of them. Further, by rotating the gate 13 through the medium of the operator 22 the gate may be turned from the open position illustrated in FIGS. 1 and 2 to the closed position illustrated in FIG. 3.

My invention relates particularly to the method of providing sealing contact between valve seats 23 which surround the openings 11 and 12 and the gate 13. In view of the fact that both the upstream and downstream seals and gate construction for supporting the same are substantially the same, a descripion of one will suffice for both.

The gate is provided with an annular shouldered portion 24 on the side thereof adjacent the valve seat 23. Mounted for movement on the annular portion 24 is a seal carrying member 26. The member 26 is mounted so as to slide substantially freely outwardly away from the gate, toward the valve seat 23 when the valve is in closed position as will presently appear.

Secured to the outer face of the annular part 24 of the gate is an annular ring 27 which acts as a stop for limiting outward movement of the sealing ring or member 26 during assembly of the structure. Screws 28 serve to secure the rings 26 and 27 together. The purpose and functioning of ring 27 will be more fully described.

Interposed between the gate and the sealing member 26 is an annular gate to sealing member seal 29. The seal 29 may be made of elastic material such as rubber or one of the synthetic elastomers presently available. On the side of the sealing ring 26 opposite the side thereof carrying gasket 29 is a sealing member to valve seat seal 31, also annular.

From what has just been described it will be seen that in the assembly of the sealing ring member 26 to the gate, gasket 29 may be put under sufficient pre-compression by the screws 28 to effect a seal and thus prevent leakage between the gate and the seal carrying ring 26. When so compressed it will be seen that the adjacent surfaces of ring 27 and the seal carrying ring 26 are in contact.

By reference to FIGS. 3 and 4, showing the valve closed, it will now be assumed that there is pressure inside the valve higher than the pressure in the opening 11 of the housing. When the seals 31 ride up on seats 23, some mechanical pressure is exerted. This pushes the ring 26 inwardly, further compressing seal 29, thus separating the coacting surfaces of the rings 26 and 27. The amount of such separation may be determined by the volume and elasticity of the seals 29 and 31 and by the height of the seats 23. Therefore, when the gate moves to closed position there is developed a predetermined amount of mechanical seating force on both gaskets 29 and 31, and the ring 26 is free to move outwardly slightly as will now be explained to increase the force on seat seal 31 and slightly to decrease the force on seal 29. Under such conditions it will be seen that the pressure acts on the surface $26^a$ of the ring 26 and also acts on the surface $26^b$ in opposition thereto. Therefore, by properly proportioning the areas indicated on FIG. 4 as $A_1$ ($26^a$) and $A_2$ ($26^b$) I can determine the effective circumferential area ($Ae$) which will result, at given unit pressure within the valve, in producing the desired force ($Ft$) with which the seat seal 31 is pressed against the seat 23. That is to say, for any given valve, designed to operate at any given unit pressure, by properly proportioning the areas subjected to the hydrostatic pressure within the valve, I can determine the force with which the seal 31 is forced against the seat 23. Since the mechanical portion of the force is small it can, for all practical purposes, be neglected. Stated mathematically: $Ft$ equals unit pressure in the valve times ($A_1$ minus $A_2$); and, $Ft$ equals unit pressure in the valve times $Ae$ (effective area).

It will be understood that the areas referred to are considered to be the circumferential areas completely around the seal carrying member 26, namely, the surfaces $26^a$ and $26^b$. It will further be noted that the provision of the stop member 27 is effective only to limit the movement of the ring 26 toward the valve seat 23 when the valve is open, thus to pre-compress the seal 29 and provide initial mechanical pressure of relatively low magnitude on seal 31 thus to assure secure initial seating of both seals. Further as the pressure load is applied to the gate the two to four thousanths inch clearance in the trunnions permits the gate to shift. The only effect of this shifting is to close very slightly the annular space 30 between the gate and ring 26. Again, any additional pressure on seals 29 and 31 occasioned by such shifting is negligible. The full load due to pressure on the gate therefore is carried directly by the trunnions and only the optimum, predetermined sealing force is imposed on seal 31.

Referring now more particularly to FIGS. 5 to 8, inclusive, I show my invention applied to a three-way rotary valve. In this instance the valve housing 32 comprises the three fluid passageways 33, 34 and 36. The gate indicated generally at 37 may have the annular boss 39, similar to the portion 24 already described. Mounted on the boss for sliding movement outwardly thereof is a seal carrying member 41, similar to the seal carrying member 26 except as will be described. The sealing member to gate seal 42, annular in shape, is provided. Because of the fact that the single sealing unit is to seal alternately against pressure entering the valve as well as to seal pressure in the valve, I provide two seat seals indicated by the numerals 43 and 44. The movement limiting member or ring 46 is held in place by screws 47.

With the valve in the position of FIG. 5 and assuming pressure to be placed on the gate structure through opening 36 in the valve housing, the conditions shown in FIG. 6 prevail. That is, the pressure acts on the surface $A_2$ of the member 41 as indicated by the small arrows. It also flows around between the member 41 and the boss 39 and acts on the surface $A_1$, also as indicated by the small arrows. Therefore, by properly proportioning the areas $A_1$ and $A_2$ I can arrive at an area $Ae$ shown in FIG. 6 which will be the effective area forcing the seal 44 against the valve seat surrounding the opening 36.

In FIG. 7 it is assumed that there is pressure in the passages 33 and 36 but no pressure in the passage 34 of the valve. In this case it will be apparent that the pressure is acting on the sealing structure from the opposite side to that shown in FIGS. 5 and 6. As shown clearly in FIG. 8 this results in the areas therein indicated by the short arrows as being under pressure, the seal 43 being the active or sealing member in this position rather than the seal 44. By properly positioning the seals 43, 44 and 42, I can provide a multi-port valve in which the seat seals are pressed against the seats equally in all positions of the valve or, unequally, when the gate is closing one port as distinguished from another. My invention thus lends itself quite readily to multi-port valves and all the previously mentioned advantages may be obtained from its use therein.

In FIGS. 9 and 10 I show my invention as applied to a sliding gate valve which, as is understood, may be of the wedge or parallel seat type. As shown, the valve housing 48 may have inlet passages 49 and 51. Since the sealing structure is identical on both sides of the valve gate 52 the description of one will suffice for both.

The seats for the valve openings are indicated at 53. The seal carrying member 54, corresponding generally to the members 26 and 41, may be an annular ring. The gate to seal carrying member seal is indicated at 56. The stop ring 57 may be secured to the gate by screws or the like 58.

With the gate closed and with pressure assumed to be in the passage 49 and no pressure in the passage 51, the conditions of FIG. 10 prevail. Pressure acts on the respective sides of the member 57 and, again, by properly proportioning the areas $A_1$ and $A_2$ I can arrive at an effective area ($Ae$) which is just sufficient to hold the seal 53 against the seat with optimum pressure.

It will be noted that FIGS. 9 and 10 illustrate a valve sealing against the pressure, that is, a valve sealed on the upstream side. If desired to seal on the downstream side, it is only necessary to reduce the diameter of seal 56 to make it less than the diameter of seal 53. Such structure would then become functionally equivalent to the arrangement of FIGS. 2 and 3.

It will be understood that the pre-compression of the seals 56 is brought about by proper positioning of the screws 58 holding the stop ring 57. Therefore, when the gate 52 is in seated position the cooperating surfaces between the rings 54 and 56 are separated very slightly. Under this condition the seal carrying member 54 is free to float very slightly, thus to accommodate itself to the movement occasioned by the pressure acting on the effective area Ae.

From the foregoing it will be apparent that I have devised an improved sealing structure for valves. It is to be especially noted that none of the forces due to pressure of the fluid in the valve and acting on the gate are transmitted to the valve seat seal. Further, there are no tramming screws or other mechanical devices interposed between the seal carrying member and the gate. Consequently, by predetermination in the design of the valve I am enabled to determine the desired pressure under any operating condition with which the seat seal will be pressed against the seat. While I have shown and described the valve seat seals as being carried by members such as 26, 41, and 54, it will be understood that in some cases I may place the seat seals 31, 43, 44, and 53 on the valve body.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are specifically set forth in the appended claim.

What I claim is:

The combination with a rotary fluid pressure valve of the kind having a body with an annular fixed valve seat surrounding a fluid passage, and a gate movable from open to closed position with respect to the fluid passage, of a substantially rigid annular seal member mounted on the gate for movement relative thereto toward and from the seat, a first annular seal of resilient rubber-like material operatively interposed between the seal member and the gate to seal therebetween, a second annular seal of resilient rubber-like material of a greater outer diameter than the outer diameter of said first seal and operatively disposed in position to seal between the seat and the seal member upon closing the gate, the relative axial dimensions of said rubber seals being sufficient upon closing the gate to distort them between their respective members and thereby prevent leakage, the relative outer diameters and positions of the rubber seals being such that said first seal exposes a greater total pressure area of the sealing member to fluid in the valve than the pressure area exposed to the fluid by the position of the second seal whereby a predetermined effective pressure area is provided on the seal member to urge the seal member toward the seat with predetermined force when subjected to fluid pressure within the valve, said urging of the seal member toward the valve seat tending to decrease the seating force of said first seal and to increase the seating force of said second seal, the distortion of the first seal between the seal member and the gate due to closing the gate being sufficiently great so that upon application of the maximum fluid pressure for which the valve is designed said first seal remains sufficiently distorted to prevent leakage between the gate and the seal member, and means spaced outwardly of the seal member operable when the gate is open to prevent the seal member from becoming detached from the gate and spaced far enough from the seal member when the gate is closed to remain out of contact with the seal member when the valve is under the maximum fluid pressure for which the valve is designed, whereby the seal member effectively "floats" on the gate between the two rubber seals.

References Cited in the file of this patent

UNITED STATES PATENTS

| | | |
|---|---|---|
| 2,751,185 | Shand | June 19, 1956 |
| 2,791,396 | Reppert | May 7, 1957 |
| 2,837,308 | Shand | June 3, 1958 |
| 2,857,130 | Brisbane | Oct. 21, 1958 |
| 2,868,498 | Kaiser | Jan. 13, 1959 |
| 2,876,984 | Reppert | Mar. 10, 1959 |